(12) United States Patent
Daksiewicz et al.

(10) Patent No.: US 10,492,075 B2
(45) Date of Patent: Nov. 26, 2019

(54) METHODS AND DEVICES FOR PROVIDING A SECURE ELEMENT WITH A SUBSCRIPTION PROFILE

(71) Applicant: Giesecke+Devrient Mobile Security GmbH, München (DE)

(72) Inventors: Daniel Daksiewicz, München (DE); Leif Östling, Bromma (SE); Thomas Larsson, Älvsjö (SE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 16/152,512

(22) Filed: Oct. 5, 2018

(65) Prior Publication Data

US 2019/0037405 A1    Jan. 31, 2019

Related U.S. Application Data

(63) Continuation of application No. 15/104,213, filed as application No. PCT/EP2014/003195 on Nov. 28, 2014.

(30) Foreign Application Priority Data

Dec. 17, 2013 (EP) .................................. 13005876

(51) Int. Cl.
*H04W 12/08* (2009.01)
*H04W 4/50* (2018.01)
(Continued)

(52) U.S. Cl.
CPC .......... *H04W 12/08* (2013.01); *H04L 67/306* (2013.01); *H04W 4/50* (2018.02); *H04W 4/60* (2018.02);
(Continued)

(58) Field of Classification Search
CPC ......... H04W 4/50; H04W 4/60; H04W 4/001; H04W 4/003; H04W 12/04; H04W 12/08;
(Continued)

(56) References Cited

U.S. PATENT DOCUMENTS 9,100,175 B2    8/2015 Nix
2009/0191857 A1    7/2009 Horn et al.
(Continued)

FOREIGN PATENT DOCUMENTS

EP    2747466 A1    6/2014

OTHER PUBLICATIONS

"3rd Generation Partnership Project; Technical Specification Group Services and System Aspects; Feasibility Study on the Security Aspects of Remote Provisioning and Change of Subscription for Machine to Machine (M2M) Equipment (Release 9)," 3GPP Standard, 3GPP TR 33.812, 3rd Generation Partnership Project (3GPP), Mobile Competence centre, No. V9.2.0, Jun. 22, 2010, pp. 1-87.
(Continued)

*Primary Examiner* — Wayne H Cai
(74) *Attorney, Agent, or Firm* — Workman Nydegger

(57) ABSTRACT

A method for providing a secure element having a processor and a memory of a mobile terminal with a target subscription profile for communicating via a target mobile network comprises the steps of: providing as a first part of the target subscription profile a subscription management interface to the secure element; implementing the subscription management interface on the secure element; and providing as a second part of the target subscription profile subscription data in a format defined by the operator of the target mobile network to the secure element, wherein the subscription management interface allows the secure element to process the subscription data and to implement the target subscription profile thereon for allowing access to the target mobile
(Continued)

network. A corresponding secure element, mobile terminal and subscription management backend system includes features associated with the method.

10 Claims, 2 Drawing Sheets

(51) Int. Cl.
    *H04W 4/60*    (2018.01)
    *H04W 8/18*    (2009.01)
    *H04W 12/04*    (2009.01)
    *H04L 29/08*    (2006.01)
    *H04W 8/26*    (2009.01)
    *H04W 48/18*    (2009.01)
    *H04W 12/00*    (2009.01)
    *H04W 8/20*    (2009.01)
    *H04W 84/04*    (2009.01)

(52) U.S. Cl.
    CPC ............. *H04W 8/183* (2013.01); *H04W 8/26* (2013.01); *H04W 12/0023* (2019.01); *H04W 12/04* (2013.01); *H04W 48/18* (2013.01); *H04W 8/205* (2013.01); *H04W 84/042* (2013.01)

(58) Field of Classification Search
    CPC ....... H04W 8/183; H04W 8/26; H04W 48/18; H04W 12/0023; H04W 8/205; H04W 84/042; H04L 67/306
    See application file for complete search history.

(56) References Cited

U.S. PATENT DOCUMENTS

| | | |
|---|---|---|
| 2009/0239503 A1 | 9/2009 | Smeets |
| 2011/0092253 A1 | 4/2011 | Amiel et al. |
| 2014/0219447 A1 | 8/2014 | Park et al. |

OTHER PUBLICATIONS

Abdalla et al., "Remote Subscription Management of M2M Terminals in 4G Cellular Wireless Networks," 2012 IEEE 37th Conference on Local Computer Networks Workshops (LCN Workshops), Oct. 22, 2012, pp. 877-885.

Extended European Search Report from EP Application No. 13005876.1, dated Jul. 4, 2014.

"GSMA One API Exchange Architecture for Cross-Operator Network APIs," requested from http://www.gsma.com/oneapi/wp-content/uploads/2013/02/GSMA_OneAPI_Exchange.pdf on Feb. 28, 2013.

International Search Report from PCT Application No. PCT/EP2014/003195, dated Mar. 5, 2015.

METHODS AND DEVICES FOR PROVIDING A SECURE ELEMENT WITH A SUBSCRIPTION PROFILE

FIELD OF THE INVENTION

The invention relates to mobile communications in general and in particular to methods and devices for providing a secure element, such as a subscriber identity module (SIM), an eUICC/UICC or the like, of a mobile terminal with a subscription profile for communicating via a mobile network.

BACKGROUND OF THE INVENTION

Communicating by means of a mobile terminal, such as a mobile phone, via a public land mobile network (PLMN; also referred to as a mobile or cellular network herein) operated by a mobile network operator (MNO) generally requires the mobile terminal to be equipped with a secure element for securely storing data uniquely identifying the user of the mobile terminal (also called subscriber). For instance, in the context of a mobile terminal configured to communicate according to the Global System for Mobile Communications (GSM), currently the world's most popular standard for mobile communications systems, the secure element is called a subscriber identity module (SIM) and is usually provided in the form of a smart card. According to the GSM standard, the technical features of which are defined by a large number of interrelated and mutually dependent specifications published by the ETSI standardization organization, the SIM contains subscription credentials for authenticating and identifying the user of the mobile terminal, including in particular an International Mobile Subscriber Identity (IMSI) and an authentication key $K_i$. These subscription credentials are generally stored on the SIM by the SIM manufacturer/vendor or the MNO during a SIM personalization process prior to providing the user of the mobile terminal with his SIM. A non-personalized SIM is generally not suited for use in a mobile terminal, i.e. the use of the services provided by a PLMN with a non-personalized SIM without the necessary subscription credentials is not possible.

One particular field of application of secure elements, such as SIMs, eUICCs, UICCs and the like, which is expected to grow rapidly in the near future is M2M (machine-to-machine) communication, i.e. the communication between machines over a mobile network without human intervention, also called the Internet of things. In M2M communication data is automatically transmitted between many different types of machines equipped with a secure element in the form of a M2M module, such as TV systems, set top boxes, vending machines, vehicles, traffic lights, surveillance cameras, sensor devices, metering devices, and the like. It is foreseeable that at least for some of these devices it will not be possible or at least very difficult to provide the secure element beforehand with the necessary subscription credentials, including for instance an IMSI. This is because in a lot of M2M devices the secure element will most likely be implemented in the form of a surface mounted chip or an embedded chip module without the possibility of providing the secure element with the necessary subscription credentials beforehand. Consequently, once in the field, these M2M devices and their non-personalized secure elements require the secure provisioning of subscription credentials over-the-air.

When using the services provided by a MNO, in particular communicating via the PLMN provided by the MNO, the user of a mobile terminal is usually charged a certain monthly fee by the MNO. If the mobile user wants, for instance due to a lower monthly charge and/or superior services, to change to a different MNO, he generally has to manually replace the SIM provided by the current MNO and containing, in particular, the subscription credentials necessary for attaching to the PLMN of the current MNO by the SIM provided by the new MNO and containing the subscription credentials necessary for attaching to the PLMN of the new MNO. Certainly, it would be more convenient for the user, if instead of this process of switching to a new MNO by manually replacing the SIM it would be possible to use one and the same secure element in the form of a SIM that can be "reprogrammed" over-the-air by downloading a corresponding subscription profile including subscription credentials and automatically implementing the same on the SIM.

Such methods for downloading a subscription profile and implementing the same on a secure element are known. However, in practice, it will often be the case that a subscription profile is provided by an entity, for instance, a mobile network operator (MNO), different to the entity that originally manufactured the secure element, i.e. the secure element manufacturer. As usually only the secure element manufacturer has knowledge about the specific details of the secure element, such as its operating system as well as any subscription management interfaces for implementing a new subscription profile on the secure element, for instance in the form of a suitably configured application programming interface (API), which, in particular, for security reasons, the secure element manufacturer wants to keep secret, the problem can arise that the subscription profile provided by an MNO is in a format that is not compatible with the subscription management interface implemented on the secure elements.

There is, therefore, a need for improved methods and devices for providing a secure element, such as a subscriber identity module (SIM), an eUICC/UICC or the like, of a mobile terminal with a subscription profile for communicating via a mobile network, wherein these methods and devices address the issues described above.

SUMMARY OF THE INVENTION

The above need is addressed according to the present invention by the subject-matter of the independent claims. Preferred embodiments of the invention are defined in the dependent claims.

According to a first aspect of the invention there is provided a method for providing a secure element having a processor and a memory of a mobile terminal with a target subscription profile for communicating via a target mobile network. The method comprises the steps of: providing as a first part of the target subscription profile a subscription management interface to the secure element; implementing the subscription management interface on the secure element; and providing as a second part of the target subscription profile subscription data in a format defined by the operator of the target mobile network to the secure element, wherein the subscription management interface allows the secure element to process the subscription data (in the format used by the operator of the target mobile network) and to implement the target subscription profile thereon for allowing access to the target mobile network.

Preferably, the subscription management interface implements a standardized API on the secure element for processing the subscription data used by the operator of the target mobile network.

According to preferred embodiments of the invention, the method comprises prior to the step of providing as a first part of the target subscription profile a subscription management interface to the secure element the additional step of attaching to a mobile network supported by a subscription profile already present on the secure element. This subscription profile already present on the secure element could be a provisioning subscription profile.

Preferably, the method comprises prior to the step of providing as a first part of the target subscription profile a subscription management interface to the secure element the additional step of requesting the target subscription profile from a subscription management backend system.

According to preferred embodiments of the invention, the method comprises after the step of implementing the subscription management interface on the secure element the additional step of sending a confirmation message to a subscription management backend system. Preferably, the step of implementing the subscription management interface on the secure element comprises the additional step of checking the integrity of the subscription management interface.

Preferably, the method comprises after the step of providing the subscription data in a format defined by the operator of the target mobile network to the secure element the additional steps of attaching to the target mobile network and sending a confirmation message to a subscription management backend system.

The present invention provides, amongst others, for the advantage that the entity providing for the target subscription profile can continue using its proprietary subscription management methods and formats, while the secure element manufacturer can continue using its subscription management methods and formats without revealing any confidential information.

As used herein, a "subscription profile" (or short "subscription") can comprise at least parts of a secure element operating system, one or more applications, files and/or data, such as subscription credentials. As used herein, the expression "providing a secure element of a mobile terminal with a subscription profile" comprises the complete exchange of an old subscription profile with a new subscription profile, the addition of a new subscription profile besides an already existing subscription profile as well as a partial exchange of an existing subscription profile which may be an update of the existing subscription profile.

According to a second aspect the invention provides for a secure element comprising a subscription profile provided to the secure element by the method according to the first aspect of the invention.

Preferably, the secure element is a subscriber identity module (SIM) for authentication/identification of a subscriber in the cellular communications network. Such a SIM communicates with the mobile terminal via a card reader therein and can be removed in principle from the mobile terminal to be either replaced by a different SIM and/or used in a different mobile terminal. Alternatively, the secure element is an integral part of the mobile terminal such as a hard-wired chip module. Such embedded secure elements are known, for instance, as embedded Universal Integrated Circuit Cards (eUICCs). Preferably, the secure element supports storage of multiple subscription profiles which may be associated with different MNOs. Generally, only one subscription profile is active at a time, as the mobile device can only be used with one subscription profile.

According to a third aspect the invention provides for a mobile terminal containing a secure element according to the second aspect of the invention.

The mobile terminal according to the present invention comprises means for communicating with a cellular communications network, in order to receive a new subscription profile. Preferably, the mobile terminal is implemented in form of a smart phone, a tablet PC, a notebook, a PDA, or the like. Alternatively the mobile terminal can be a multimedia device such as digital picture frame, audio equipment, a TV system, a set top box, an e-book reader and so on. By way of example, the term "mobile terminal" also includes any kind of machinery, like vending machines, vehicles, smart-meters and the like that are configured to communicate via a cellular communications system.

According to a fourth aspect the invention provides for a subscription management backend system configured to provide a secure element of a mobile terminal with a subscription profile by means of the method according to the first aspect of the invention.

These and other features, characteristics, advantages, and objects of the invention will be clear from the following detailed description of preferred embodiments, given as a non-restrictive example, under reference to the attached drawings. The person skilled in the art will appreciate, in particular, that the above preferred embodiments can be combined in several ways, which will result in additional advantageous embodiments that are explicitly supported and covered by the present invention. In particular, the person skilled in the art will appreciate that the above described preferred embodiments can be implemented in the context of the different aspects of the invention.

DETAILED DESCRIPTION OF PREFERRED EMBODIMENTS

Figure 1:
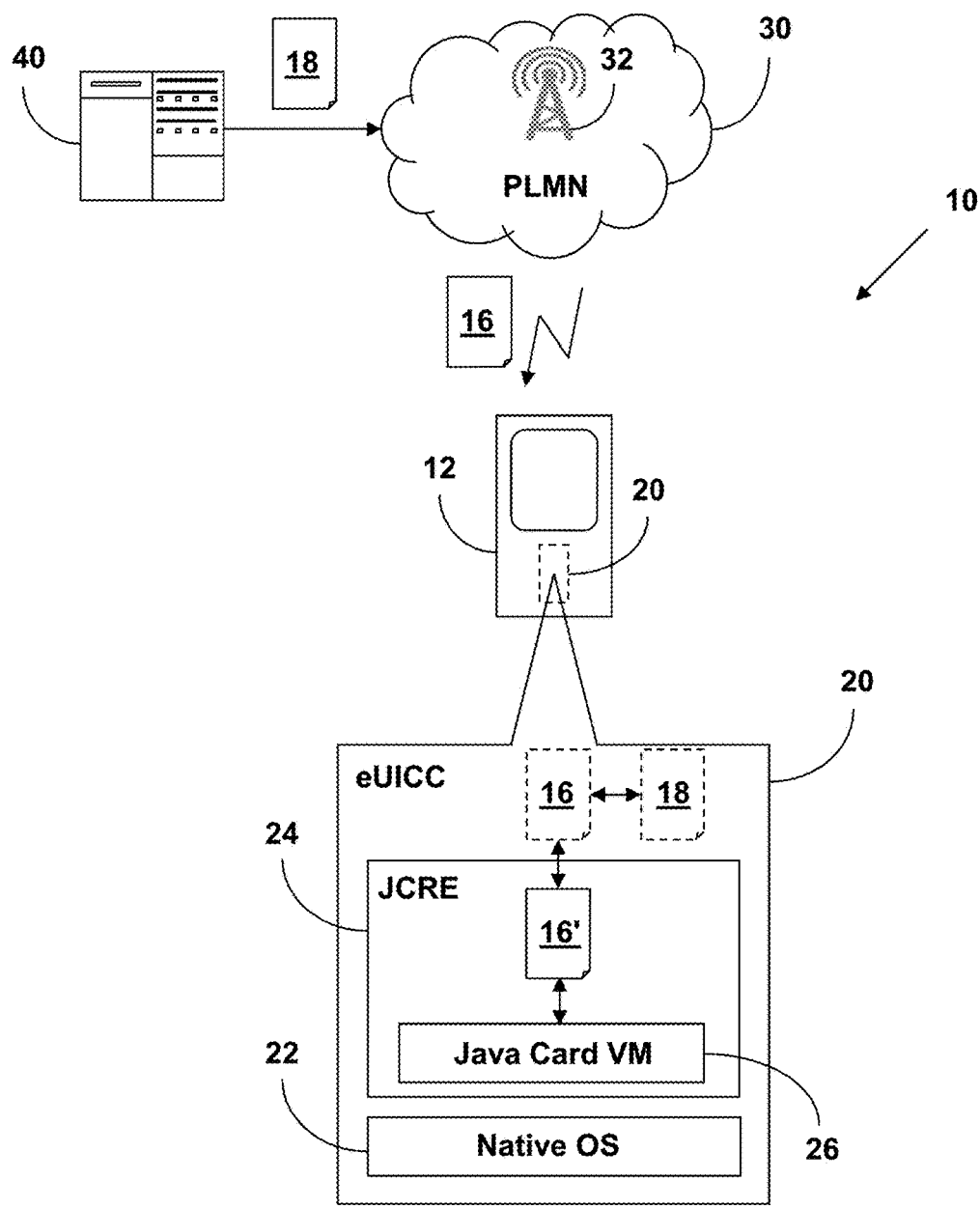
FIG. 1 shows a schematic overview of a communications system illustrating several aspects of the present invention.

FIG. 1 shows schematically the components of a communications system 10 as well as some of the communication channels or links between the components of this system 10 that illustrate several aspects of the present invention. Although the below detailed description will refer to a "mobile" terminal, the person skilled in the art will appreciate that the present invention can be advantageously implemented in the context of any kind of devices that are configured to communicate via a mobile or cellular communications network. In other words, the attribute "mobile" used herein refers to the ability of a terminal to communicate via a mobile or cellular communications network, also including IP based mobile communication networks.

An exemplary mobile terminal 12 is shown in FIG. 1 including a secure element 20 for securely storing and processing data that uniquely identifies the secure element 20, the mobile terminal 12 and/or its user. As indicated in FIG. 1, the mobile terminal 12 preferably is a mobile phone, smart phone or a similar device. The person skilled in the art will appreciate, however, that the mobile terminal 12 according to the present invention can be implemented in the form of other devices as well, such as a tablet or notebook computer, a TV system, a set top box, a vending machine, a vehicle, a surveillance camera, a sensor device and the like.

According to preferred embodiments of the invention the secure element 20 is configured as an eUICC or UICC with a SIM application running thereon, i.e. a secure element that can be mounted in the mobile terminal 12 and used in cellular communications systems for unique and secure subscriber identification as well as for the provision of different special functions and value-added services. Alternatively, the secure element 20 could be configured as a subscriber identity module (SIM), the SIM currently being the most popular type of secure element. The person skilled in the art will appreciate, however, that other types of secure elements that, depending on the underlying generation and type of cellular communications system standard, are designated as USIM, R-UIM, ISIM, CSIM and the like, are also encompassed by the present invention. Moreover, the secure element 20 could be a M2M module or a Trusted Execution Environment (TEE) implemented as part of the mobile terminal 12.

As already mentioned above, the mobile terminal 12 is configured to communicate via the air interface (or radio link) with a cellular communications network or public land mobile network (PLMN) 30, preferably operated by a mobile network operator (MNO) according to the GSM standard, for using services provided by the PLMN 30, such as communicating with other mobile terminals connected therewith. In the following, preferred embodiments of the invention will be described in the context of a cellular communications network according to the standards of the Global System for Mobile communication (GSM), as specified in a number of specifications provided by ETSI. However, the person skilled in the art will appreciate that the present invention may be advantageously applied in connection with other cellular communications systems as well. Such systems include third-generation cellular communications systems (3GPP), such as the Universal Mobile Telecommunications System (UMTS), and next generation or fourth-generation mobile networks (4G), such as Long Term Evolution (LTE), as well as other cellular communications systems.

As is well known to the person skilled in the art, a PLMN configured according to the GSM standard generally comprises a base station subsystem consisting of one or more base transceiver stations that define respective cells of the PLMN and are connected to a base station controller. Generally, the base station controller is one of several base station controllers that communicate with a common mobile switching center (MSC). Often, a local database called Visitor Location Register (VLR) for keeping track of the mobile users currently located within the cells covered by a MSC (i.e. the MSC service area) is incorporated in the MSC. The MSC provides essentially the same functionality as a central office switch in a public-switched telephone network and is additionally responsible for call processing, mobility management, and radio resource management. The MSC is further in communication with a home location register (HLR), which is the primary database of the PLMN that stores information about its mobile users required for authentication. To this end, the HLR generally is in communication with an authentication center (AUC). The person skilled in the art will appreciate that although the above described components of a conventional GSM system may have different names in different or consecutive standards for mobile communications networks, the underlying principles used therein are substantially similar and, therefore, compatible with the present invention.

Of the above described components of the PLMN 30 only an exemplary base transceiver station 32 is shown in the schematic drawing of FIG. 1 for ease of explanation. The PLMN 30 is at least in temporary communication with a subscription management backend system 40 for providing the secure element 20 of the mobile terminal 12 with a subscription profile, as will be described in more detail further below. The PLMN 30 moreover could comprise a SMS-C (Short Message Service Center) for storing, forwarding, converting and delivering SMS messages. Such SMS messages could be used for transmitting a subscription profile or at least parts thereof to the secure element 20 of the mobile terminal 12.

As can be taken from the enlarged view of the secure element 20 in FIG. 1, the following preferred software architecture is implemented thereon. A Java Card™ runtime environment (JCRE) 24 is implemented on top of a native operating system (OS) 22 of the secure element 20. Generally, the native operating system 22 and the Java Card™ runtime environment 24 are installed by the manufacturer during the manufacturing process of the secure element 20. The Java Card™ runtime environment 24 comprises a Java Card™ Virtual Machine (JCVM) 26 as well as at least one Java Card™ application programming interface (API) 16'. By means of Java Card™ APIs any applets running on the secure element 20 can execute functions that are provided by the Java Card™ Virtual Machine 26 and the native operating system 22. Further details about this conventional software architecture can be found, for instance, in the book "Java Card™ Technology for Smart Cards", Zhiqun Chen, Addison-Wesley, 2000, which is fully incorporated herein by reference.

As will be appreciated by the person skilled in the art, for implementing and running the above described software components the secure element 20 generally will comprise a central processing unit (CPU) for processing data as well as a memory unit for storing data, which for the ease of illustration are not shown in FIG. 1. Preferably, the CPU is configured such that at least one application can be executed on the CPU providing for features that will be described in the context of FIG. 2 in more detail further below. The application could be implemented, for instance, as a Java Applet. Preferably, the memory unit is implemented as a non-volatile, rewritable flash memory. Preferably, at least a portion thereof is configured to securely store secret data therein, such as subscription credentials that are part of a subscription profile. Preferably, the memory unit supports storage of multiple subscription profiles, for instance, in the form of "slots" for accommodating subscription profiles, such as a subscription profile to be provided by the subscription management backend system 40 according to the process shown in FIG. 2 and described in more detail further below. The multiple subscription profiles may be associated with one MNO or different MNOs.

Preferably, a first subscription profile can be stored in the memory unit of the secure element 20 during the manufacturing and/or personalization process of the mobile terminal 12 and/or its secure element 20. Especially in this preferred embodiment it is conceivable that this first subscription profile is merely a provisional subscription profile only providing for basic services that allow the secure element 20 and mobile terminal 12 to communicate with the subscription management backend system 40 and to download a more complete subscription profile providing for additional services. As a provisional subscription profile generally provides only a limited functionality, the user of the mobile terminal 12 generally will be enticed to change to a more complete subscription profile providing for additional services.

Generally, a subscription profile can comprise at least parts of an operating system of the secure element 20, one or more applications, such as a PLMN access application containing a MNO specific authentication algorithm, files and/or data, such as subscription credentials that allow the secure element 20 and the mobile terminal 12 to attach to the PLMN 30, for instance an International Mobile Subscriber Identity (IMSI) for identifying and/or an authentication key $K_i$ for authenticating the secure element 20.

A preferred way of operating the subscription management backend system 40, preferably in the form of a subscription management server 40, in combination with the other elements of the communications system 10 shown in FIG. 1 will now be described under further reference to FIG. 2.

Figure 2:
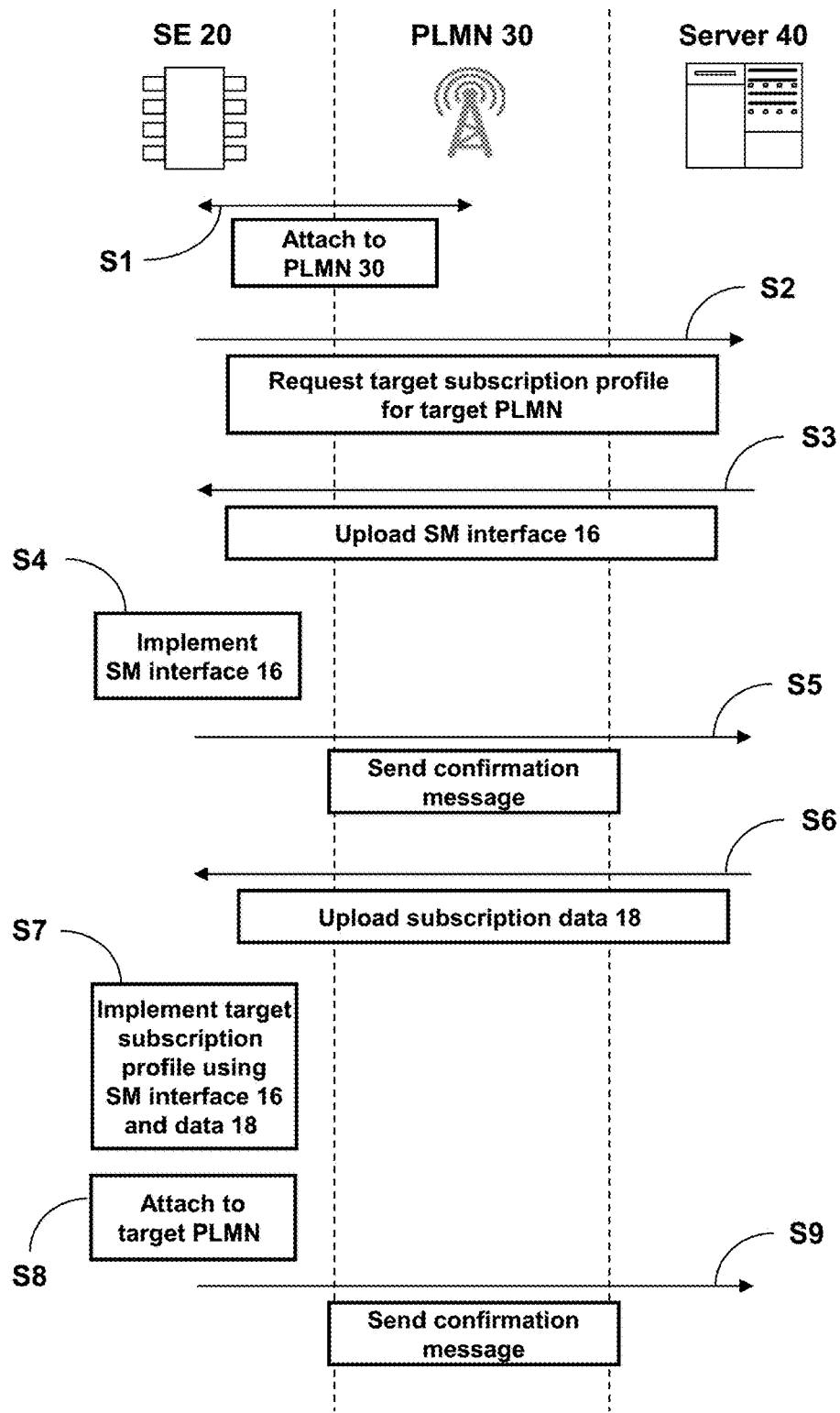
FIG. 2 shows a diagram illustrating a method for providing a subscription profile to the secure element of a mobile terminal according to a preferred embodiment of the invention.

In step S1 of FIG. 2, the secure element 20 attaches to the PLMN 30 by using the subscription profile (or one of the subscription profiles) and, in particular, the subscriptions credentials thereof stored in the memory unit of the secure element 20. Having successfully attached to the PLMN 30, the secure element 20 requests in step S2 of FIG. 2 to retrieve a new subscription profile for accessing a target PLMN from the subscription management backend system 40. As the person skilled in the art will appreciate, this target PLMN 30 could be the PLMN 30 or a different PLMN operated by a different MNO. In response to this request, the subscription management backend system 40 uploads in step S3 of FIG. 2 a subscription management interface 16 to the secure element 20.

After having downloaded the subscription management interface 16 from the subscription management backend system 40 in step S3 of FIG. 2, the subscription management interface 16 is implemented on the secure element 20 in step S4 of FIG. 2. Prior to implementing the subscription management interface 16 this step could include the additional step of checking the integrity of the subscription management interface 16 by the secure element 20, for instance, by calculating a checksum. The subscription management interface 16 could be implemented as an applet that together with the Java Card™ APIs 16' already present on the secure element 20 provides for an API that allows to interact with and process a subscription profile having a format used by the MNO of the target PLMN.

Preferably, the secure element 20 sends in step S5 of FIG. 2 a confirmation message to the subscription management backend system 40 that the subscription management interface has been implemented successfully. In response to this confirmation message, the subscription management backend system 40 uploads the subscription data 18 in the format provided by the MNO of the target PLMN to the secure element 20 (step S6 of FIG. 2).

Having receiving the subscription data in the format provided by the MNO of the target PLMN, the secure element in step S7 of FIG. 2 processes this subscription data 18 using the subscription management interface 16 implemented on the secure element 20 in step S4 of FIG. 2. In doing so, the secure element 20 implements the target subscription profile.

Once the target subscription profile has been successfully implemented on the secure element 20, the secure element 20 can try to attach to the target PLMN (step S8 of FIG. 2). In case of a successful attachment to the target PLMN, the secure element 20 preferably sends a confirmation message to the subscription management backend system 40 (step S9 of FIG. 2).

Before or substantially concurrently with implementing the target subscription profile on the secure element 20 the subscription management backend system 40 preferably sends a confirmation message to the MNO of the target PLMN. In response thereto the MNO can activate the subscription credentials of the target subscription profile in its HLR/AUC so that the mobile terminal 12 and its secure element 20 can attach to the target PLMN using the subscription credentials of the target subscription profile.

In light of the above detailed description the person skilled in the art will appreciate that modifications and/or additions can be made to the methods, devices and systems as described heretofore, which are to be considered to remain within the scope of the present invention as defined by the appended claims. In particular, the person skilled in the art will appreciate that the present invention is not restricted to the number and sequence of steps shown in FIG. 2. For instance, steps S3 and S6 of FIG. 2 could be incorporated in a single step.

The invention claimed is:

1. A method for providing a secure element having a processor and a memory of a mobile terminal with a permanent target subscription profile for communicating via a target mobile network, wherein the method comprises the steps of:

providing a first subscription profile for the secure element, the first subscription profile being a provisional subscription profile that is configured to connect the secure element to the target mobile network;

providing, from a subscription management backend system of the target mobile network, as a first part of the permanent target subscription profile a subscription management interface to the secure element, wherein the subscription management interface is not present on the secure element prior to being provided by the subscription management backend system;

implementing the subscription management interface on the secure element; and providing, from the subscription management backend system, as a second part of the permanent target subscription profile subscription data in a format defined by an operator of the target mobile network to the secure element;

wherein the subscription management interface allows the secure element to process the subscription data and to implement the permanent target subscription profile thereon for allowing access to the target mobile network.

2. The method of claim 1, wherein the subscription management interface implements a standardized application programming interface on the secure element for processing the subscription data used by the operator of the target mobile network.

3. The method of claim 1, wherein the method comprises prior to the step of providing as a first part of the target subscription profile a subscription management interface to the secure element the additional step of requesting the target subscription profile from the subscription management backend system.

4. The method of claim 1, wherein the method comprises after the step of implementing the subscription management interface on the secure element the additional step of sending a confirmation message to the subscription management backend system.

5. The method of claim 1, wherein the step of implementing the subscription management interface on the secure element comprises the additional step of checking the integrity of the subscription management interface by the secure element.

6. The method of claim 1, wherein the method comprises after the step of providing the subscription data in a format defined by the operator of the target mobile network to the secure element the additional steps of attaching to the target mobile network and sending a confirmation message to the subscription management backend system.

7. A secure element comprising a subscription profile provided to the secure element by the method according to claim 1.

8. The secure element of claim 7, wherein the secure element is configured as a subscriber identity module (SIM) or an embedded Universal Integrated Circuit Cards (eUICCs).

9. A mobile terminal containing a secure element according to claim 7.

10. A subscription management backend system configured to provide a secure element of a mobile terminal with a subscription profile by the method according to claim 1.

* * * * *